K. C. RANDALL.
ELECTRICAL PROTECTIVE DEVICE.
APPLICATION FILED NOV. 6, 1915.
1,204,485.
Patented Nov. 14, 1916.
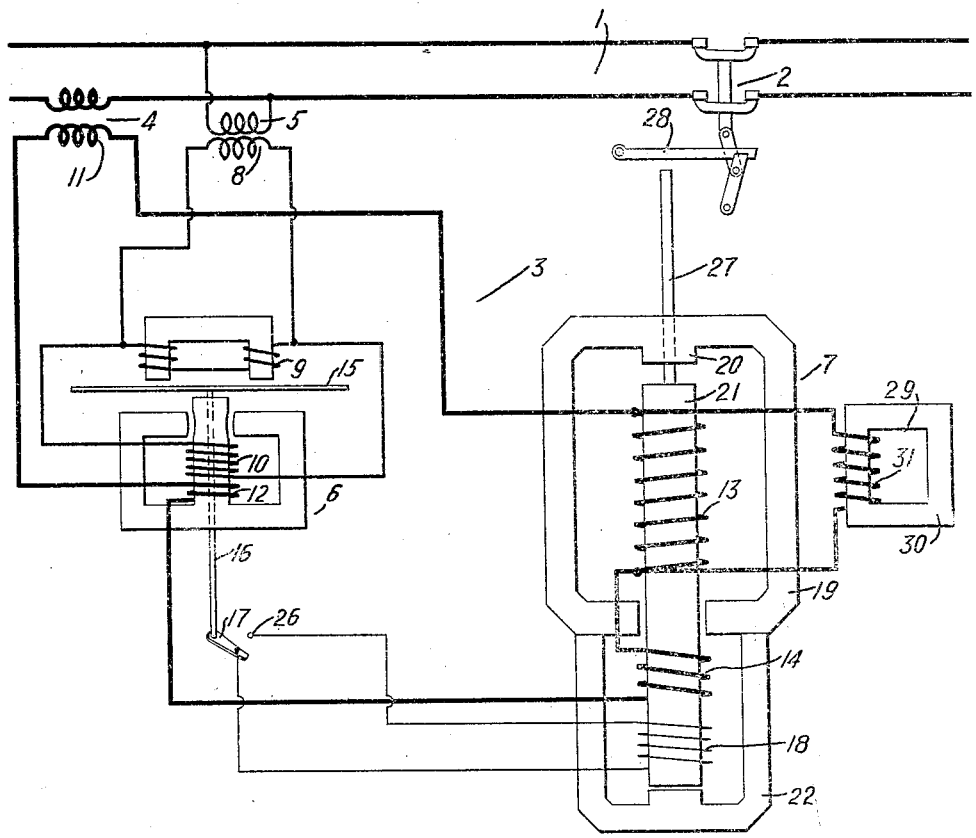
WITNESSES:
Fred A. Lind.
J H Procter
INVENTOR
Karl C. Randall
BY
Wesley G. Carr
ATTORNEY

UNITED STATES PATENT OFFICE.

KARL C. RANDALL, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

ELECTRICAL PROTECTIVE DEVICE.

1,204,485. Specification of Letters Patent. Patented Nov. 14, 1916.

Application filed November 6, 1915. Serial No. 60,006.

*To all whom it may concern:*

Be it known that I, KARL C. RANDALL, a citizen of the United States, and a resident of Edgewood Park, in the county of Allegheny and State of Pennsylvania, have invented a new and useful Improvement in Electrical Protective Devices, of which the following is a specification.

My invention relates to electrical protective devices and particularly to trip-coil mechanisms that are employed to trip circuit interrupters or other similar devices upon the occurrence of predetermined circuit conditions.

My invention has for its object to provide a device, of the above indicated character, that will operate correctly upon any value of overload.

Copending application, Serial No. 850,331, filed by B. H. Smith, July 11, 1914, and assigned to the Westinghouse Electric and Manufacturing Company, discloses a relay system that comprises a time-element relay which controls an auxiliary winding on the tripping electromagnet for the purpose of permitting the electromagnet to operate under predetermined conditions. With a device of this type, a circuit interrupter may be tripped by current derived from a circuit in connection with which the circuit interrupter is employed without subjecting the contact members of the relay to any injurious arcing or welding. However, when a device of this type is employed to interrupt very large currents, the tripping electromagnet may frequently operate irrespective of the operation of the relay.

In order to cause the tripping electromagnet to operate correctly for any value of current, I provide an impedance circuit that I connect in shunt relation to the main actuating coil of the electromagnet, and I so proportion the circuit that, when a relatively large overload traverses the main circuit, a relatively large part of the current will be shunted from the main winding, and a disproportionately less value of current will be shunted from the main winding when a relatively small overload traverses the circuit. Thus, the retaining winding is provided with relatively more current than the main actuating winding when a relatively large overload traverses the circuit to prevent the tripping of the circuit interrupter until after the operation of the relay.

The single figure of the accompanying drawing is a diagrammatic view of a distributing system embodying my invention.

An alternating-current circuit 1 is provided with an interrupter 2 that is controlled in its operation by a relay system 3 which derives its energy from the circuit 1 through a current transformer 4 and a voltage transformer 5. The relay system 3 comprises a tripping electromagnet 7 and a relay 6 that is of the induction type and is preferably constructed as set forth in application, Serial No. 497,799, filed May 22, 1909, by Frank Conrad and assigned to the Westinghouse Electric and Manufacturing Company. The secondary winding 8 of the transformer 5 is connected to the windings 9 and 10 of the relay 6, and the secondary winding 11 of the transformer 4 is connected in series relation to the winding 12 of the relay 6 and the windings 13 and 14 of the electromagnet 7. The relay 6 is provided with an armature 15 that is mounted on a shaft 16 which is provided with a contact arm 17. The contact arm 17 coöperates with a stationary contact member 26 for the purpose of controlling the circuit of an auxiliary or controlling winding 18 of the electromagnet 7.

The electromagnet 7 comprises a stationary core member 19 in the form of a hollow rectangle having a pole-piece 20 extending inwardly and downwardly from the upper cross-piece thereof and having a gap in the lower cross-piece through which projects a movable core member 21 that is adapted for longitudinal, vertical movement. A substantially E-shaped portion 22 is mounted with its longer legs terminating adjacent to the lower end of the core member 19. The movable core member 21 normally rests upon the middle leg or pole-piece of the core part 22, and, together with the middle leg or pole-piece, is surrounded by the windings 14 and 18. The movable core member 21 is provided with an operating rod 27 that is adapted to trip the latch 28 of the circuit interrupter 2, under predetermined conditions. An inductive device 29, comprising a magnetizable core member 30 and a winding 31, is connected in shunt relation to the main actuating winding 13 of the electromagnet 7.

As hereinbefore stated, the windings 13 and 14 are supplied with current from the secondary winding 11 of the transformer 4 and are preferably connected in series with the winding 12 of the relay 6, although they may be connected in any other suitable relation with respect thereto. The winding 17 is normally open-circuited but is adapted to be closed-circuited by the engagement of the contact members 17 and 26 of the relay 6, under predetermined conditions, such, for instance, as upon the occurrence of an overload or a reversal of direction of flow of energy in the circuit 1.

Under normal circuit conditions, the current in the winding 12 of the relay 6 is insufficient to cause the switch 17—26 to close, and, consequently, the winding 18 remains open-circuited and is not affected. However, the windings 13 and 14 are continuously energized so long as the circuit interrupter 2 remains closed, but, being located upon opposite sides of the lower end crosspiece of the core member 19, and being also provided with separate magnetic circuits, they exert opposing forces upon the core member 21. The magnetic circuit of the winding 14 being substantially closed, under normal conditions, the movable core member 21 remains stationary in the position shown. Also, since the magnetic circuit of the winding 14 is normally closed, whereas, a considerable air gap exists at the upper end of the movable core member 21 in the magnetic circuit of the winding 13, it is obvious that the winding 14 may, and preferably does, have a smaller number of convolutions than the winding 13.

When a normal overload occurs upon the circuit 1, an increased current is induced in the winding 11 of the transformer 4 that is sufficient to cause the relay 6 to close the switch 17—26, the closing of which may be delayed or not, as desired. When the switch 17—26 is closed, the winding 18 is closed-circuited and an electromotive force is induced by it in the winding 14, thereby decreasing the magnetizing effect of the winding 14 because of the counter flux produced by the winding 18. When the magnetizing effect of the winding 14 is reduced, the pull exerted by the winding 13 is permitted to predominate over that of the winding 14, and the movable core member 21 will rise in its entirety, thereby tripping the circuit interrupter 2.

The inductive device 29 is so proportioned that, when normal overloads traverse the circuit 1, a relatively small part of the current that traverses the winding 13 will be shunted through the winding 31. Hence, when a normal overload occurs upon the circuit 1, the inductive device 29 does not materially affect the operation of the electromagnet 7. However, if an abnormal or an excessive overload occurs, a relatively large part of the current that would normally traverse the winding 13 is shunted therefrom by the inductive device 29 to thus cause the current traversing the winding 14 to be relatively greater than that traversing the winding 13. That is, relatively more current traverses the winding 14 than traverses the winding 13 under normal conditions. By so shunting out some of the current from the winding 13, under excessive overloads, the winding 13 will be permitted to restrain the movable core member 21 in its lowermost position until the operation of the relay 6 closes the switch 17—26 to permit the current to traverse the winding 18, thereby neutralizing the magnetizing effect of the winding 14 and permitting the circuit interrupter 2 to be tripped.

I do not limit my invention to the particular device illustrated, as it may be variously modified within the scope of the appended claims.

I claim as my invention:

1. An electromagnetic device comprising a stationary core member, a movable core member, two series-connected windings for the movable core member, a reactor connected in shunt relation to one of the series-connected windings, a third winding, and means for closing the circuit of the said third winding under predetermined conditions to neutralize the effect of one of the series-connected windings.

2. In a relay system, the combination with an electromagnet comprising a stationary core member, a movable core member, two windings for governing the operation of the movable core member, and means for neutralizing the magnetizing effect of one of the windings under predetermined conditions, of means for neutralizing the effect of the other winding under other predetermined conditions.

3. In a relay system, the combination with an electromagnet comprising a stationary core member, a movable core member, two windings for governing the operation of the movable core member, and means for neutralizing the magnetizing effect of one of the windings under predetermined conditions, of means for shunting a relatively large part of the current from the other winding under other predetermined conditions.

4. In a relay system, the combination with an electromagnet comprising a stationary core member, a movable core member, two windings for governing the operation of the movable core member, and means for neutralizing the magnetizing effect of one of the windings, under predetermined conditions, of a reactor for shunting a relatively large part of the current from the other winding under other predetermined conditions.

5. In a relay system, the combination with an electromagnet comprising a stationary core member, a movable core member, two windings for governing the operation of the movable core member, and means for neutralizing the magnetizing effect of one of the windings, under predetermined conditions, of a reactor for shunting a relatively large part of the current from the other winding when a relatively large overload traverses the windings.

6. In a relay system, the combination with an electromagnet comprising a stationary core member, a movable core member, two windings for governing the operation of the movable core member, and means for neutralizing the magnetizing effect of one of the windings under predetermined conditions, of an impedance device so proportioned that a relatively large part of the current is shunted from the other winding when relatively large overloads traverse the same, and a relatively small part of the current is shunted from the other winding when relatively small overloads traverse the same.

7. An electromagnet comprising a movable core member, a tripping rod, a winding tending to actuate the rod, a second winding for preventing the actuation of the rod, and means connected in shunt relation to the first-mentioned winding for shunting a relatively large part of the current therefrom under predetermined conditions.

8. An electromagnet comprising a movable core member, a tripping rod, a winding tending to actuate the rod, a second winding for preventing the actuation of the rod, and means connected in shunt relation to the first-mentioned winding for shunting a relatively large part of the current therefrom under predetermined conditions and for shunting a relatively small part of the current therefrom under other predetermined conditions.

9. In a circuit interrupting system, the combination with a circuit interrupter and a relay, of a tripping electromagnet comprising a movable member, a winding tending to actuate the same, a second winding for preventing the actuation of the movable member, means controlled by the relay for neutralizing the effect of the second winding, and means connected in shunt to the first-mentioned winding for neutralizing the effect thereof only when an excessive overload traverses the circuit interrupter.

10. In a relay system, the combination with an electromagnet comprising a stationary core member, a movable core member, an actuating winding, a holding winding, and means for neutralizing the magnetizing effect of the holding winding under predetermined conditions, of means for causing the said holding winding to predominate over the actuating winding under all conditions until the neutralizing means is actuated.

In testimony whereof I have hereunto subscribed my name this 25th day of Oct. 1915

KARL C. RANDALL.